United States Patent [19]
Berton et al.

[11] Patent Number: 5,170,344
[45] Date of Patent: Dec. 8, 1992

[54] PROGRAMMABLE ELECTRONIC CONTROL SYSTEM FOR MACHINES FOR THE PRODUCTION OF PASTY FOODSTUFFS, ESPECIALLY MACHINES FOR MAKING ICE-CREAM

[75] Inventors: Mario Berton, Vigonza; Jamil Chehab, Altavilla Vicentina; Genesio Bravo, Alte di Montecchio Maggiore, all of Italy

[73] Assignee: Bravo S.p.A., Vincenza, Italy

[21] Appl. No.: 599,859

[22] Filed: Oct. 19, 1990

[30] Foreign Application Priority Data

Oct. 20, 1989 [IT] Italy ............ 22072 A/89

[51] Int. Cl.$^5$ .......... G06F 15/46; F25C 1/00
[52] U.S. Cl. ............ 364/400; 62/135; 364/188; 364/557; 366/145
[58] Field of Search ......... 364/140, 141, 468, 400, 364/188, 189, 557, 510, 478, 502; 366/138, 147, 149, 142, 145; 62/135, 303, 340, 342, 343, 136, 157, 158, 231

[56] References Cited

U.S. PATENT DOCUMENTS

| | | | |
|---|---|---|---|
| 4,606,200 | 8/1986 | Nielsen | 366/149 |
| 4,698,984 | 10/1987 | Manfroni | 366/149 X |
| 4,719,574 | 1/1988 | Duback et al. | 364/468 |
| 4,860,550 | 8/1989 | Aoki et al. | 366/138 X |

Primary Examiner—Joseph Ruggiero
Attorney, Agent, or Firm—Longacre & White

[57] ABSTRACT

The control system comprises at least one common hardware section (1) for all anticipated applications, consisting essentially of a control keyboard card (2), a display card (3) and a logic card (5), including a microprocessor (6), a non-volatile memory (7), at least one thermometer probe (4), and a control relay unit (10) for the different working parts of the machine under control, and software for the said microprocessor (6), varying as a function of the intended application of the hardware section (1).

12 Claims, 6 Drawing Sheets

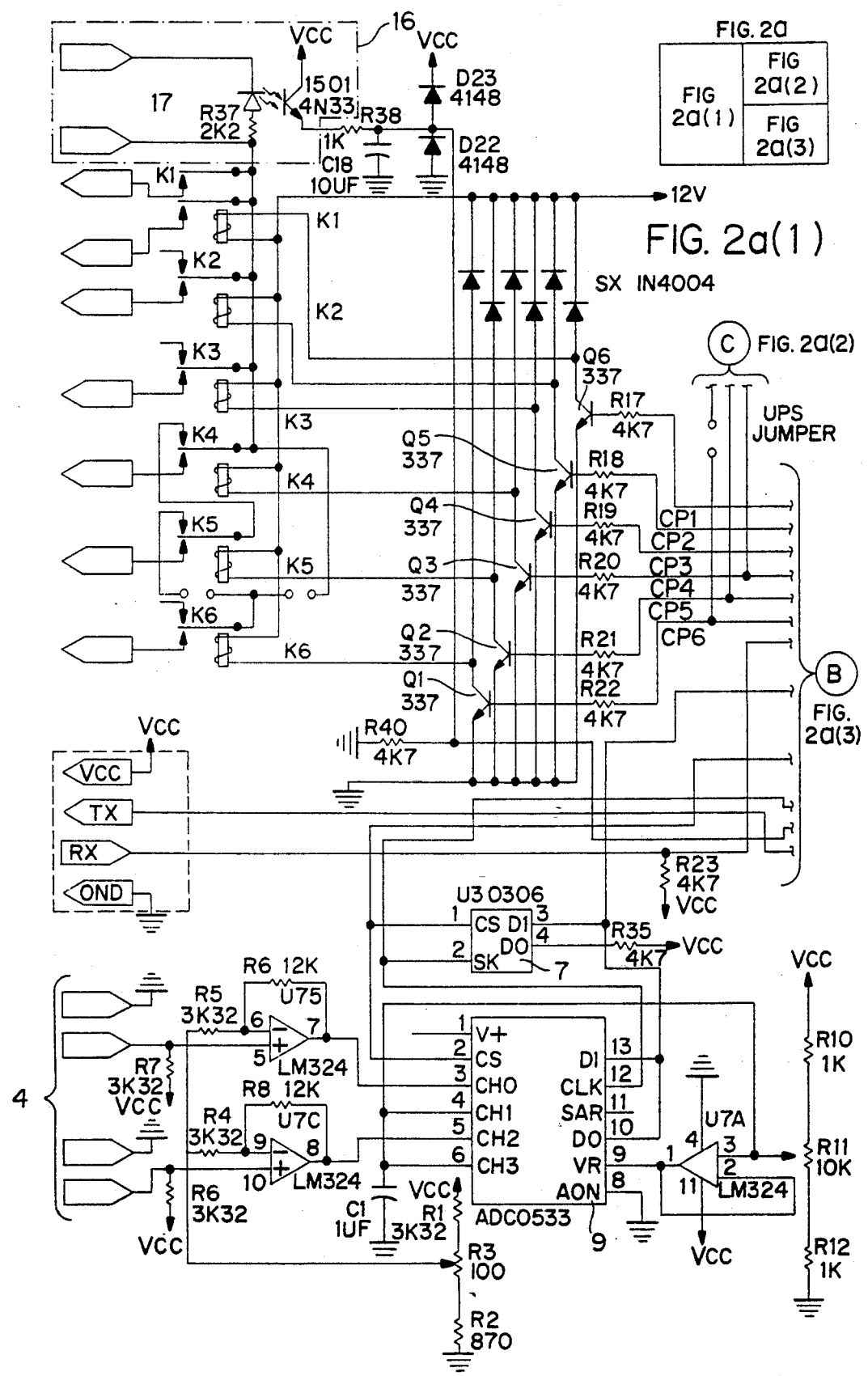

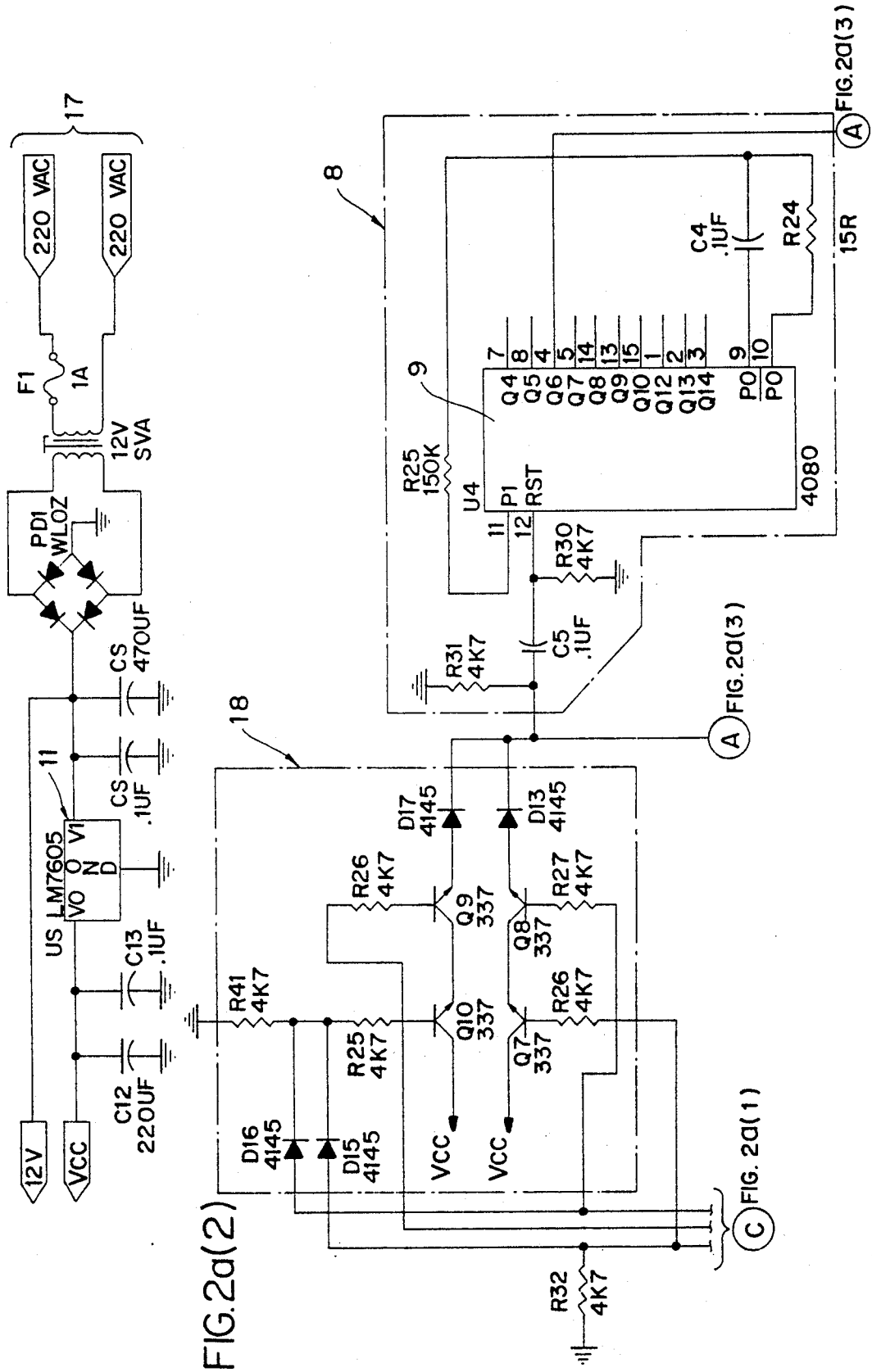
FIG.2a(2)

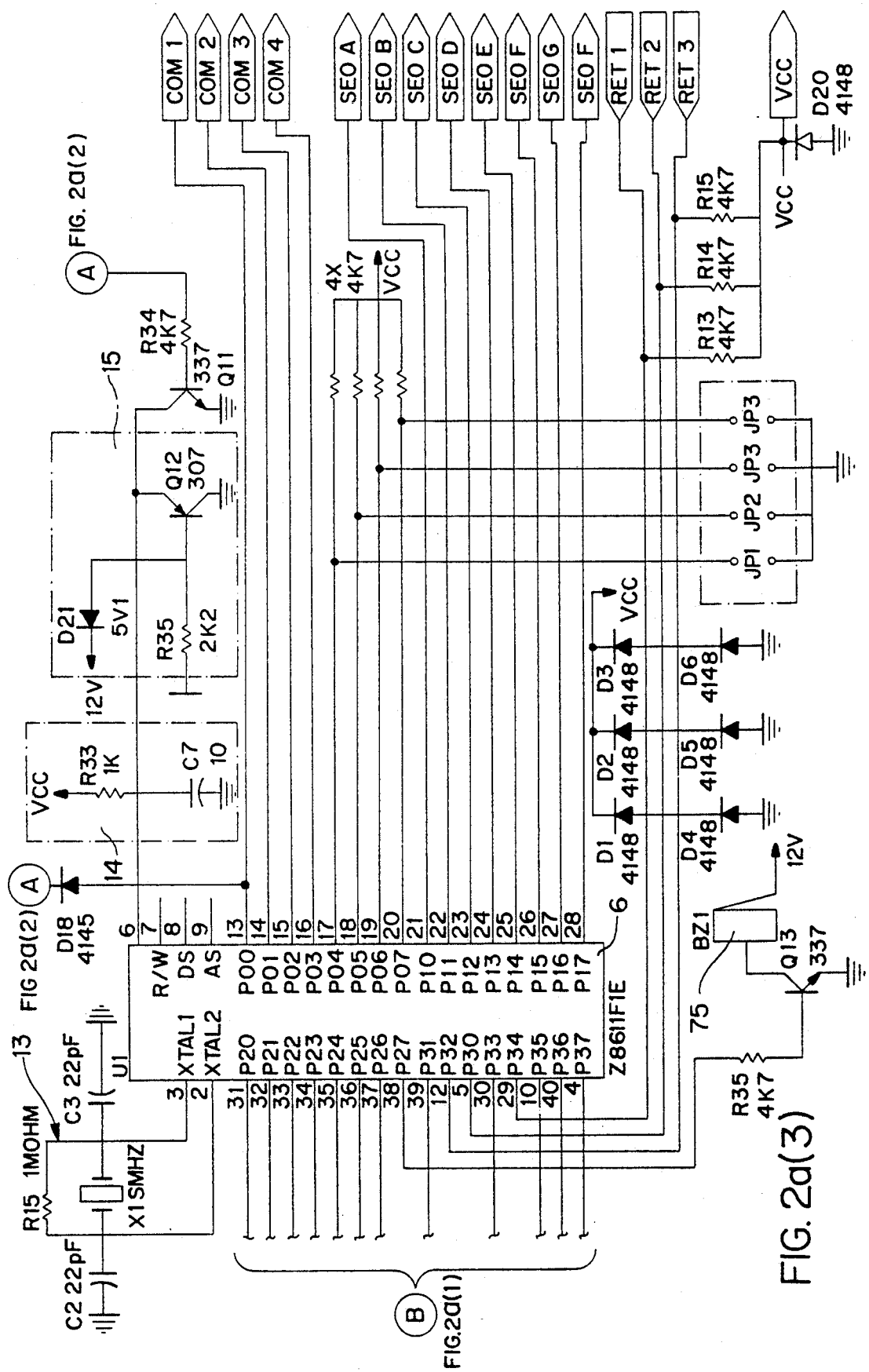
FIG. 2a(3)

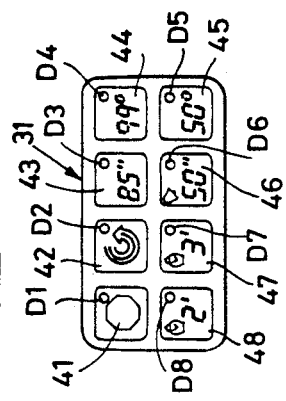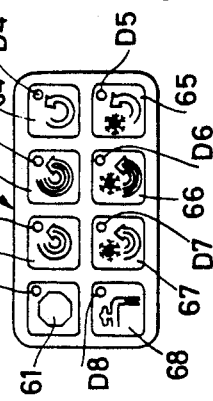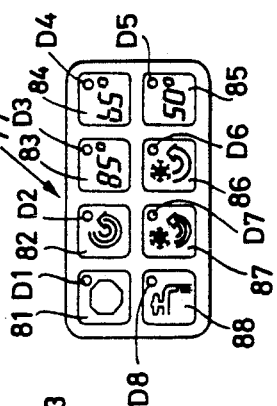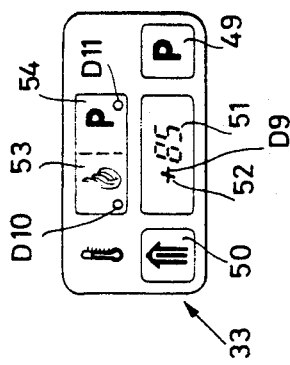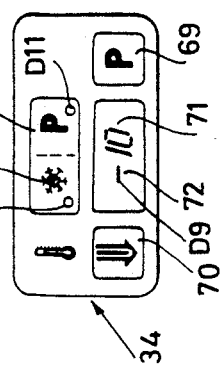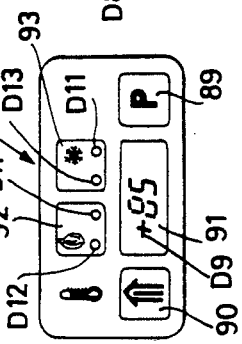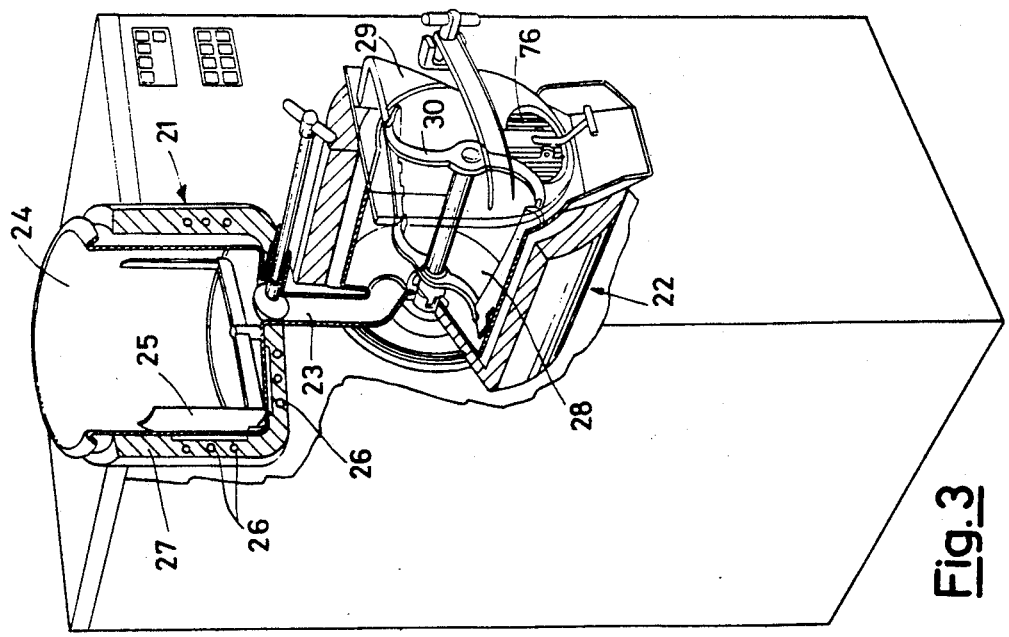

PROGRAMMABLE ELECTRONIC CONTROL SYSTEM FOR MACHINES FOR THE PRODUCTION OF PASTY FOODSTUFFS, ESPECIALLY MACHINES FOR MAKING ICE-CREAM

This invention relates to a programmable electronic control system designed so that it can be adapted rapidly to numerous machines for the production of pasty foodstuffs, such as machines for making ice-cream.

It is known that the production of ice-cream is effected in two phases: a mixing and pasteurization phase and a whipping phase. The two operations are normally carried out in different machines, but may also be combined in one single machine, e.g. of the type described in Italian Patent Specifications Nos. 996102 and 1055984, owned by the same Applicant. The latter is also capable of producing pasty foodstuffs other than ice-cream, such as granita, various creams, bechamels, etc..

It is also known that modern machines for making ice-cream must have high adaptability in their application, so that it is possible to produce a wide range of ice-creams of different flavours and, as already mentioned hereinbefore, not simply ice-creams. It is for this reason that it is necessary to be able to programme the machine in different ways depending on the desired product, so that the machine can be operated according to the preselected programme. The problem then arises of associating an appropriate control system, which can be programmed according to the requirements of the user, with the machine or machines adapted for the two pasteurization and whipping operations (or modified for the preparation of granita, creams, etc.).

At the same time, it should be taken into account that in the case of a machine of this kind, and also in the case of other machines having analogous or complementary characteristics and produced by one single manufacturer, it is generally preferable, for reasons of costs, for the various control systems used to differ as little as possible from one another.

Therefore, the object of this invention is to provide a programmable electronic control system for machines for making ice-cream, and more generally for the production of pasty foodstuffs, which can be used immediately for machines consisting of one single body and also for machines composed of separate units.

This problem is solved according to the invention by a programmable electron control system for a plurality of applications, characterized in that it comprises at least one common hardware section for all the abovementioned applications, consisting essentially of a control keyboard card, a display card and a logic card, including a microprocessor, a non-volatile memory, at least one thermometer probe, and a control relay unit for the different working parts of the machine under control, and software for the said microprocessor.

A control system of this kind is obviously capable of solving the problem of the programmable control of a wide range of machines of the said type and in particular of separate or combined units of machines for making ice-cream or other foodstuffs in a pasty state, e.g. the machine for making ice-cream consisting of one single body forming the object of the two abovementioned Italian patent specifications. In the latter case, in particular, it is possible to use a control system formed of two identical hardware sections of the aforementioned type, with selectable software for the two machine parts adapted for the two pasteurization and whipping operations.

One embodiment of the control system according to the invention, together with its possible applications, will now be described in more detail, for the sake of greater clarity, with reference to the accompanying drawings, in which:

FIG. 1 shows a basic block diagram of the hardware section of the control system according to the invention;

FIGS. 2a and 2b together show a detailed circuit diagram of one embodiment of the said hardware section;

FIG. 3 shows, in diagrammatic form, an example of a machine for making ice-cream consisting of one single body, including pasteurization and whipping units, to which a control system using two hardware sections such as those illustrated in the abovementioned drawings can be applied;

FIGS. 4 and 5 show the control keyboard and the display unit respectively, related to the pasteurization unit of the said machine;

Figure 2B:
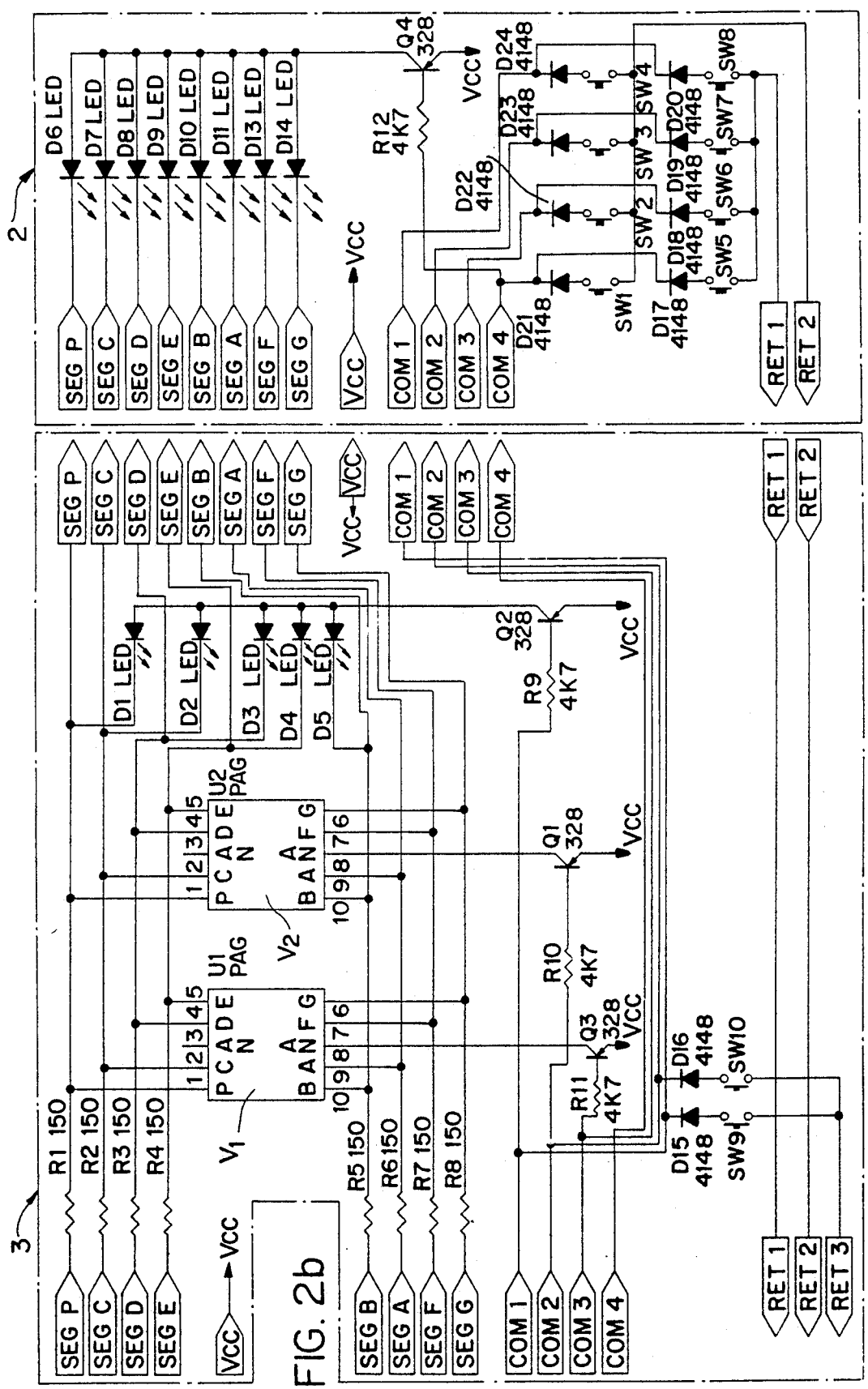

FIGS. 6 and 7 show the control keyboard and the display unit respectively, related to the whipping unit of the said machine, and FIGS. 8 and 9 show the control keyboard and the display unit respectively of a pasteurizing machine, to which a control system using a hardware section such as the one in FIGS. 2a and 2b can be applied.

Figure 1:
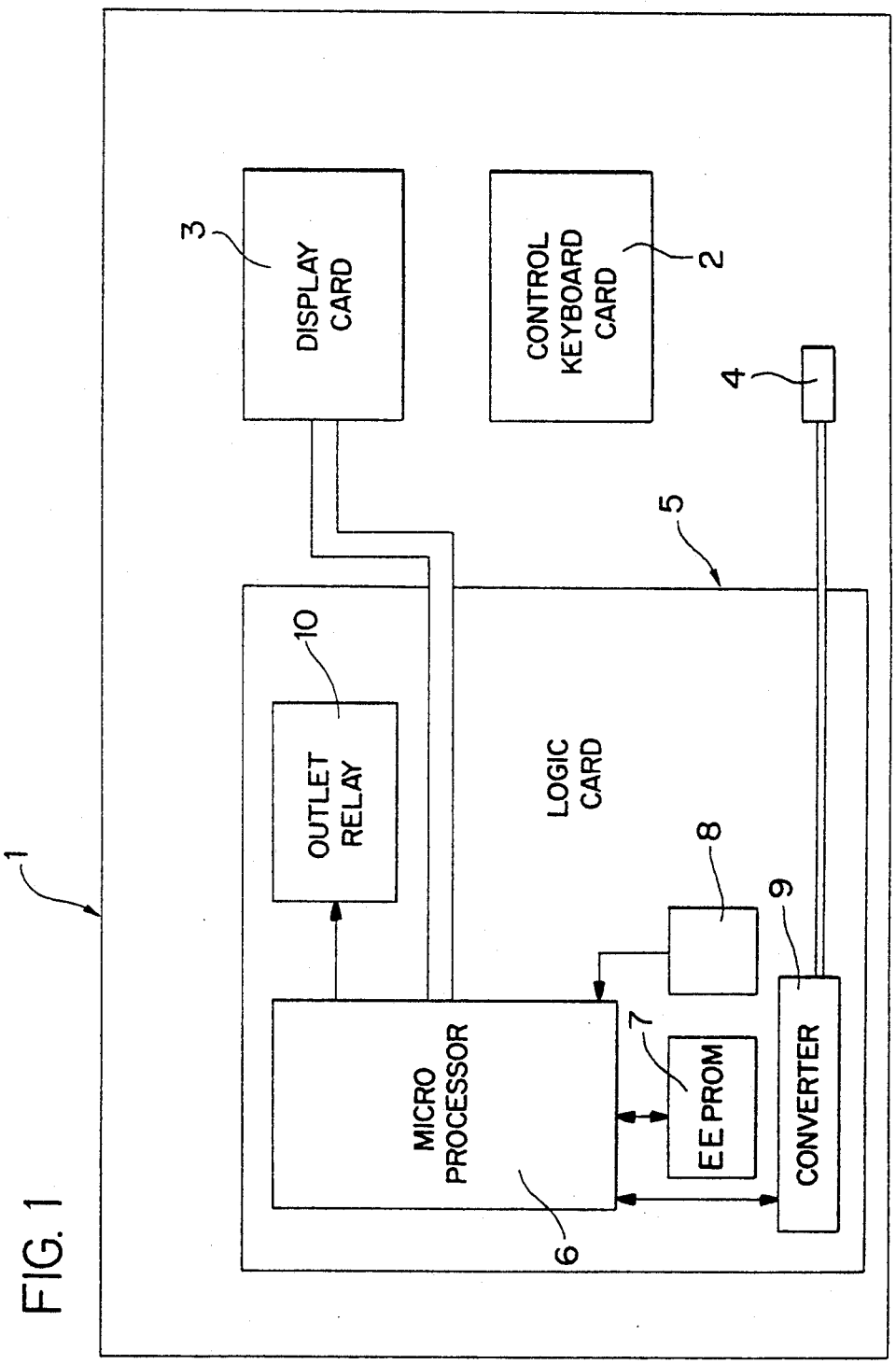

In FIG. 1, 1 designates a hardware section for an electronic control system, comprising a control keyboard card 2, a display card 3, thermometer probes 4 and a logic card 5, for its part including a microprocessor 6, an EEPROM memory 7, a self-reset circuit 8, an analogue-digital converter 9 interposed between the thermometer probes 4 and the microprocessor 6 and an outlet relay unit 10 intended to control the different working parts of the machine or the machine parts under control.

In more detail, the abovementioned software section is produced, e.g. as in FIGS. 2a and 2b, where the keyboard card 2 is shown to consist of eight switches SW1-SW8 controlled by respective keyboard buttons provided on the front of the machine under control and provided with respective signalling photodiodes D1-D8, e.g. seven of yellow and one of green. In the same FIGS. 2a and 2b, the display card 3 is shown to consist of two numerical display units V1 and V2 having seven segments, two state photodiodes D11 and D10, one sign photodiode D9 and two switches SW9 and SW10 controlled by respective programming buttons provided on the front of the machine.

Inside the logic card 5 on the other hand, is a relay unit 10 formed, in this particular example, of six relays K1-K6 with associated piloting circuits CP1-CP6. In addition to the units and components already illustrated in FIG. 1 (microprocessor 6, EEPROM memory 7, self-reset circuit 8 and analogue-digital converter 9), there is also a stabilized power supply 11, a quartz oscillator 13, a reset circuit 14, a circuit 15 for monitoring the supply voltage, a stopper circuit 16, a plurality of connector bars 17 and an output monitoring circuit 18.

A hardware section such as the one illustrated in FIGS. 2a and 2b can be used for the programmable control of machines or machine parts of various types for the production of pasty foodstuffs, such as whipping machines, pasteurizers, machines for making granita, creams, etc.. When passing from one machine to the next, the software used is selected simply by means of an appropriate jumper connection JP1-JP4, while the hardware remains exactly the same.

Two identical hardware sections using respective software can be used, on the other hand, for the programmable control of a machine for making ice-cream consisting of one single pasteurizer/whipping machine body of the type described and illustrated in the two Italian patent specifications mentioned at the beginning of this description.

As shown in FIG. 3, a machine of this kind comprises a pasteurization unit 21 and a whipping unit 22 connected to one another by means of a duct 23. The pasteurization unit 21 comprises a tank 24 having a vertical axis and charged from above, inside which an electric motor (not shown) rotates a mixer 25, and which is heated by appropriate electrical resistors 26 embedded in an outer casing 27 of insulating material and cooled by a refrigeration unit (not shown).

The whipping unit 22, for its part, comprises a tank 28 having a horizontal axis and with discharge at the front, and with an outlet vent 76 and a window 29 that can be opened, and in which an electric motor (not shown) rotates a mixer 30 and which is cooled by an appropriate refrigeration unit (not shown).

According to this invention, identical hardware sections of the type illustrated in the form of a block diagram in FIG. 1 and in greater detail in a circuit diagram in FIGS. 2a and 2b can be associated with the two pasteurization 21 and whipping 22 units, the keyboard card 2 and the display card 3 being linked to respective keyboards 31 and 32 and to respective display units 33 and 34 situated on the front of the machine and shown in detail in FIGS. 4-7.

As shown in FIG. 4, the keyboard 31 of the pasteurization unit 21 comprises a stop button 41, an agitation button 42, a button for pasteurization at 85° C. 43, possibly a button for pasteurization at 99° C. 44, possibly a button for a chocolate cycle at 50° C. 45, an intermediate temperature (50° C.) alarm button 46, a 3-minute timer button 47 and a 2-minute timer button 48. The abovementioned buttons 41-48 control the switches SW1-SW8 respectively of the associated hardware section (FIGS. 2a and 2b) and are provided with the photodiodes D1-D8 respectively of the same hardware section.

On the other hand, as shown in FIG. 5, the display unit 33 of the pasteurization unit 21 comprises a programming button 49 and a forward button 50, controlling the switches SW9 and SW10 respectively of the associated hardware section, a two-figure numerical display 51 controlled by the two display units V1 and V2 of FIGS. 2a and 2b, a plus sign display 52, a heating display 53 and a programming display 54, these last three being provided with the photodiodes D9, D10 and D11 respectively of FIGS. 2a and 2b.

The keyboard 32 of the whipping unit 22, shown in FIG. 6, comprises, for its part, a stop button 61, an average speed agitation button 62, a high speed agitation button 63, possibly a low speed agitation button 64, possibly a granita and cream button 65, a high speed whipping timer button 66, an average speed whipping button 67 and a water delivery button 68. The abovementioned buttons control the switches SW1-SW8 respectively of the associated hardware sections and are provided with the photodiodes D1-D8 respectively of the same hardware section.

The display unit 34 of the whipping unit 22 finally comprises a programming button 69 and a forward button 70, controlling the switches SW9 and SW10 respectively of the associated hardware section, a two figure numerical display 71 controlled by the two display units V1 and V2 of FIGS. 2a and 2b, a minus sign display 72, a cooling display 73 and a programming display 74, these last three being provided with the photodiodes D9, D10 and D11 respectively of FIGS. 2a and 2b.

By virtue of different software selected in an appropriate manner by means of jumper connections JP1-JP4 for the two identical hardware sections described hereinabove, the machine for making ice-cream described hereinabove can be operated in the desired manner, which can vary with the choice of the software. In particular, it is possible to provide the following currently preferred method of operation, which, moreover, is described only by way of example and is in no way limiting.

First of all, the programming operation must be carried out, with respect to both the pasteurization unit and the whipping unit. This operation is usually left to the installer.

With reference to the pasteurization unit 21, once the machine is connected to the electrical network, the display D1 (e.g. having a green light) of the stop button 41 is illuminated, while the numerical display 51 and the other photodiodes D2-D11 remain switched off. In this case, when the programming button 49 is pressed, the numerical display 51 and the sign display 52 (the latter only in the case of plus temperatures) are switched on to indicate the current temperature of the pasteurization tank 24. When the stop button 41 is pressed again, the displays 51 and 52 are switched off.

In order to start programming, after pressing the programming button 49 and thus switching on the numerical display 51 and the sign display 52 (the latter only in the case of plus temperatures), it is necessary to press the forward button 50 several times in order to arrange and show on the display 51 a prearranged number forming an access key or code for programming (e.g. 55). In the event of an error when entering the access code, the display 51 indicates the current temperature of the tank again and denies access to programming.

Subsequently, if the access code has been entered correctly, while the programming display 54 comes on and the numerical display 51 flashes, it is possible to proceed to programming proper according to the following procedures, which are effected in sequence following successive actuation of the programming button 49:

Programming pasteurization at 85° C.

When the programming button 49 is pressed for a first time, the photodiode D3 begins to flash, the heating display 53 comes on and the numerical display 51, in combination with the sign display 52, indicates the preset temperature (85° C. as a typical value).

The final heating temperature can be adjusted as desired (between 20° C. and 99° C.) by pressing the forward button 50. Otherwise, the latter is left at rest.

Programming pasteurization at 99° C.

When the programming button 49 is pressed for a second time, the photodiode D4 begins to flash, the heating display 53 comes on and the numerical display 51, in combination with the sign display 52, indicates the preset temperature (99° C. as a typical value).

The final heating temperature can once again be adjusted as desired (between 20° C. and 99° C.) by pressing the forward button 50. Otherwise, the latter is left at rest.

Programming a chocolate cycle at 50° C.

Heating phase

When the programming button 49 is pressed again, the photodiode D5 flashes and the displays 51 and 52 indicate the preset temperature (40° C. as a typical value).

The temperature can be adjusted between 20° C. and 50° C. by means of the forward button 50.

Rest phase

When the programming button 49 is pressed, the photodiode D5 flashes and the display 51 indicates the preset time (10 minutes as a typical value).

The time can be adjusted between 1 and 15 minutes by means of the forward button 50.

Cooling phase

When the programming button 49 is pressed, the photodiode D5 flashes and the displays 51 and 52 indicate the preset temperature (27° C. as a typical value).

The temperature can be adjusted between 20° C. and 30° C. by means of the forward button 50.

Final heating phase

When the programming button 49 is pressed, the photodiode D5 flashes and the displays 51 and 52 indicate the preset temperature (29° C. as a typical value).

The temperature can be adjusted between 20° C. and 50° C. by means of the forward button 50.

Programming an intermediate temperature (50° C.) alarm

When the programming button 49 is pressed once again, the photodiode D6 begins to flash and the displays 51 and 52 indicate the preset temperature (50° C. as a typical value).

The temperature can be adjusted between 30° C. and 70° C. by means of the forward button 50.

Programming 3-minute timing

When the programming button 49 is pressed, the photodiode D7 begins to flash and the display 51 indicates the preset timing (3 minutes as a typical value).

The timing can be adjusted between 1 and 9 minutes by means of the forward button 50.

Programming 2-minute timing

When the programming button 49 is pressed, the photodiode D8 begins to flash and the display 51 indicates the preset timing (2 minutes as a typical value).

The timing can be adjusted between 1 and 9 minutes by means of the forward button 50.

Hot gas programming

When the programming button 49 is pressed, the photodiode D5 flashes and the displays 51 and 52 indicate the preset temperature (20° C. as a typical value).

The temperature can be adjusted between 0° C. and 35° C. by means of the forward button 50.

Hot gas differential programming

When the programming button 49 is pressed the photodiode D5 flashes and the displays 51 and 52 indicate the preset temperature (4° C. as a typical value).

The temperature can be adjusted between 1° C. and 9° C. by means of the forward button 50.

End of programming

When the programming button 49 is pressed once again, the displays 51 and 52 go off. This indicates that programming is finished.

If the programming cycle is not completed, after approximately 10 seconds the control system returns automatically to the initial state.

On the other hand, as far as the whipping unit 22 is concerned, once the machine is connected to the electrical network, the display D1 of the stop button 61 is illuminated, while the numerical display 71 and the other photodiodes D2–D11 remain switched off. In this case, when the programming button 69 is pressed, the numerical display 71 and the sign display 72 (the latter only in the case of minus temperatures) come on to indicate the current temperature of the whipping tank 28. When the stop button 61 is pressed again, the displays 71 and 72 go off.

In order to start programming, after pressing the programming button 69 and thus switching on the numerical display 71 and the sign display 72 (the latter only in the case of minus temperatures), it is necessary to press the forward button 70 several times in order to arrange and show on the display 71 a prearranged number forming an access key or code for programming (e.g. 55). In the event of an error when entering the access code, the display 71 indicates the current temperature of the tank again and denies access to programming.

Subsequently, if the access code has been entered correctly, the programming display 74 comes on and the numerical display 71 flashes, and it is then possible to proceed to programming proper according to the following procedures, which are effected in sequence following successive actuation of the programming button 69:

Programming post-cooling time with high speed extraction

When the programming button 69 is pressed for a first time, the photodiode D7 associated with the whipping button 67 begins to flash and the display 71 indicates the preset time (10 seconds as a typical value).

The post-cooling time can be adjusted as desired (between 1 and 20 seconds) by pressing the forward button 70. Otherwise, the latter is left at rest.

Programming cooling pause for the cream and granita cycle

Cream cycle with compressor connected

When the programming button 69 is pressed, the photodiode D5 associated with the low speed cooling button 65 flashes, the cooling display 73 comes on and the display 71 indicates the preset cooling time (60 seconds as a typical value).

The above time can be adjusted between 10 and 99 seconds by actuating the forward button 70.

Cream cycle with compressor disconnected

When the programming button 69 is pressed, the photodiode D5 flashes, the cooling display 73 goes off and the display 71 indicates the preset rest time (3 minutes as a typical value).

The above time can be adjusted between 2 and 9 minutes by actuating the forward button 70.

Continuous cooling cycle for granita

When the programming button 69 is pressed, the photodiode D5 flashes, the cooling display 73 comes on and the display 71 indicates the continuous cooling temperature ($-2°$ C. as a typical value).

The temperature can be adjusted between $-5°$ C. and $+5°$ C. by means of the forward button 70.

Granita cycle with compressor connected

When the programming button 69 is pressed, the photodiode D5 associated with the low speed cooling button 65 flashes, the cooling display 73 comes on and the display 71 indicates the preset cooling time (60 seconds as a typical value).

The above time can be adjusted between 10 and 99 seconds by actuating the forward button 70.

Granita cycle with compressor disconnected

When the programming button 69 is pressed, the photodiode D5 flashes, the cooling display 73 goes off and the display 71 indicates the preset rest time (2 minutes as a typical value).

The above time can be adjusted between 2 and 9 minutes by actuating the forward button 70.

Programming high speed whipping time

When the programming button 69 is pressed, the photodiode D6 associated with the high speed cooling or whipping button 66 begins to flash and the display 71 indicates the preset whipping time (10 seconds as a typical value).

The above time can be adjusted between 1 and 20 seconds by means of the forward button 70.

Programming water delivery time

When the programming button 69 is pressed, the photodiode D8 comes on and the display 71 indicates the preset time (10 seconds as a typical value).

The above time can be adjusted between 1 and 99 seconds by means of the forward button 70.

End of programming

When the programming button 69 is pressed again, the display 71 goes off.

It is not necessary to use the access code for programming average speed whipping and for low speed granita/cream. Operations of this kind can thus be left directly to the user.

If, during the programming described hereinabove, the cycle is not completed, after approximately 5 seconds the control system returns automatically to the initial state.

Once programming of the two pasteurization and whipping units has been effected, generally by the installer, the machine is ready to operate according to a series of instructions to be selected by the user.

As far as the pasteurization unit 21 is concerned, these are as follows:

Agitation

When the agitation button 42 is pressed, the associated photodiode D2 is illuminated and the displays 51 and 52 indicate the temperature of the pasteurization tank 24. This also applies to the subsequent functions. The mixer or agitator 25 is then in operation.

Pasteurization at 85° C.

When the pasteurization button 43 is pressed, the associated photodiode D3 comes on together with the heating display 53, the electrical resistors 26 are energized and the mixer 25 is in operation. This situation continues until the programmed temperature is reached. At this point, heating is stopped together with the associated display 53 and the displays 51 and 52 flash, indicating the final heating temperature. A buzzer, designated 75 in FIGS. 2a and 2b, alerts the operator by means of an appropriately selected sound. The tank 24 continues to be thermostated with a variation in temperature of 2° C. until the stop button 41 is pressed or until passage into the agitation phase as a result of pressing the button 42.

Pasteurization at 99° C.

When the pasteurization button 44 is pressed, the associated photodiode D4 comes on together with the heating display 53, the electrical resistors 26 are energized and the mixer 25 is in operation. The cycle is analogous to the preceding one with a variation in the value of the final heating temperature.

Chocolate cycle

First heating phase

When the button 45 is pressed, the associated photodiode D5 comes on together with the heating display 53, the resistors 26 are energized and the mixer 25 is in operation. This situation continues until the programmed temperature is reached (typical value 40° C.). At this point, heating is stopped together with the associated display 53.

Second timed rest phase

The mixer 25 continues to operate and the pasteurization tank 24 continues to be thermostated with a variation in temperature of 2° C. for the programmed time (typical value 10 minutes).

Third cooling phase

After the pause, the mixer 25 continues to operate, while the compressor of the refrigeration unit associated with the pasteurization tank 24 is switched on. This situation continues until the programmed temperature is reached (typical value 27° C.).

Fourth final heating temperature phase

The refrigeration unit associated With the pasteurization tank 24 remains switched on with commutation from a cold solenoid valve to a hot solenoid valve.

The display 53 comes on and the mixer 25 is in operation until the programmed temperature is reached (typical value 29° C.). At this point, the refrigeration unit with the hot gas solenoid valve is switched off together with the associated display 53, the displays 51 and 52 flash, indicating the end of cycle temperature and the buzzer 75 sounds.

Intermediate temperature (50° C.) alarm

This function can be used in combination with the cycles for pasteurization at 85° C. and 99° C. When the button 46 is pressed, the associated photodiode D6 comes on. When the programmed intermediate temperature is reached, the buzzer 75 sounds and the display 51 flashes. The resistors 26 and the mixer 25 are not affected. In order to cancel the function, it is necessary to press the button 46 once again.

3-minute - 2- minute timing

This function can be used alone or in association with agitation, pasteurization at 85° C., pasteurization at 99° C. and the chocolate cycle, also pressing the associated buttons 42-45. When the buttons 47 and 48 respectively are pressed, the associated photodiodes D7 and D8 thus come on. The associated timing thus having started, when the respective times of 3 minutes and 2 minutes are reached, the buzzer 75 sounds and the photodiodes D7, D8 flash for a predetermined number of times, e.g. three, and then go off. If the buttons 47 and 48 are pressed simultaneously, the times are added together (typical value 5 minutes).

It should be noted that the stop button 41 always takes priority over all the others.

In the absence of a power supply, upon reset, the pasteurization unit goes into the stop position.

On the other hand, as far as the whipping unit 22 is concerned, the operating instructions are as follows:

Average speed agitation

When the button 62 is pressed, the associated photodiode D2 comes on and the displays 71 and 72 indicate the temperature of the mixture present in the whipping tank or cylinder 28, this also applying to the subsequent functions. The mixer 30 is operated at an average speed.

High speed agitation (extraction)

When the button 63 is pressed, the associated photodiode D3 comes on, with the displays 71 and 72 in the abovementioned state, and the mixer 30 is operated at high speed.

If this operation is effected at the end of the whipping (extraction) operation, moreover, the change in speed from average to high speed also results in actuation of the compressor of the refrigeration unit associated with the whipping tank for a period of 10 seconds.

Low speed agitation

This can be an optional function, activated by pressing the button 64. The photodiode D4 is then illuminated and the mixer 30 is operated at low speed.

Cooling with low speed agitation for creams (plus final heating temperature)

This too can be an optional function. It is activated by pressing the button 65, resulting in lighting of the photodiode D5, operation of the mixer 30 at low speed and alternating actuation of the compressor of the refrigeration unit, active for 60 seconds and inactive for 3 minutes. This situation continues until the end of cycle temperature is reached. At this point, the compressor and the photodiode D5 go off, the displays 71 and 72 flash, indicating the final cooling temperature and the buzzer 75 sounds. The mixer 30 remains in operation and the whipping tank 28 remains thermostated with a variation in temperature of 1° C. In order to extract the cream produced, it is necessary to press the low speed agitation button 64.

Cooling with low speed agitation for granita (minus final cooling temperature)

This is activated by pressing the button 65, resulting in lighting of the photodiode D5, operation of the mixer 30 at low speed and actuation of the compressor of the refrigeration unit, until a continuous temperature of −2° C. is reached. At this point, the cooling cycle begins to operate intermittently, with the refrigeration unit active for 60 seconds and inactive for 2 minutes until the end of cycle temperature is reached. At this point, a new rest phase of 2 minutes begins, at the end of which the displays 71 and 72 flash, indicating the final cooling temperature and the buzzer 75 sounds. The mixer 30 remains in operation and the whipping tank 28 remains thermostated with a variation in temperature of 1° C. In order to extract the granita produced, it is necessary to press the low speed agitation button 64.

In the case of the abovementioned granita/cream function, it is possible for the user to adjust the end of cycle temperature. To this end, the programming button 69 must be pressed, resulting in flashing of the photodiode D4 associated with the low speed agitation button 64, lighting of the cooling display 73, and flashing of the displays 71 and 72. The temperature indicated can be adjusted by means of the forward button 70, for cream between +35° C. and +5° C., and for granita between 0° C. and −9° C. Once the desired temperature has been selected, either the system waits for approximately 5 seconds and returns to the initial state, or the button 65 is pressed for the production of granita/cream.

Cooling with the agitator operating at an average speed (whipping)

When the button 67 is pressed, the associated photodiode D7 comes on and the mixer 30 operates at an average speed, together with the compressor of the refrigeration unit. The situation continues until the end of cycle temperature is reached.

At this point, the compressor and the photodiode D7 go off, the displays 71 and 72 flash, indicating the final whipping temperature and the buzzer 75 sounds. The mixer 30 continues to operate and the whipping tank 28 continues to be thermostated with a variation in temperature of 1° C.

For the production of soft ice-cream, it is possible to effect agitation at high speed for a short period (10 seconds). To this end, it is necessary to press the button 63, resulting in lighting of the photodiode D6, operation of the mixer 30 at high speed and actuation of the compressor. After approximately 10 seconds, the photodiode D6 goes off and there is a return to whipping with average speed agitation.

The button 63 is also pressed for the final extraction of the ice cream, after opening of the vent 76 according to the method already described under section b).

In the case of the whipping function, it is possible for the user to adjust the end of cycle temperature. To this end, it is necessary to press the programming button 69, resulting in flashing of the photodiode D7, lighting of the cooling display 73, lighting of the programming photodiode D11 and flashing of the displays 71 and 72. The temperature indicated can be adjusted between −5° C. and −13° C. by means of the forward button 70. Once the desired temperature has been selected, either the system waits for approximately 5 seconds and returns to the initial state, or the whipping button 67 is pressed.

Water delivery

This function has two modes of operation according to how the button 68 is pressed, and is obtained after pressing the forward button 70.

Momentary delivery

The button 68 is pressed and held in this manner for the total desired time. When it is released, delivery stops.

Continuous timed delivery

The button 68 is pressed and immediately released. Delivery is effected for the time programmed by the installer.

It should be noted that the three agitation buttons 62, 63 and 64 are interlocked and rapid agitation with the compressor can be used only in the whipping phase.

The stop button 61 has priority over all the others, interrupting any phase, even if it has already started.

If the window 29 of the whipping tank is opened, the machine is stopped as a result of the intervention of the stopper circuit 16 included in the hardware section of the whipping unit 22 (FIGS. 2a and 2b). In this case, the machine prepares itself automatically for the initial cycle, which should be selected again by the operator.

If, following stoppage, the temperature of the whipping tank 28 falls to $-15°$ C., the whipping unit is stopped and does not start up again until the said tank returns to the operating temperature. For reasons of safety, in this case, the machine remains at a standstill, even if any of the buttons are pressed.

In the absence of a power supply, upon reset, the machine moves to the idle state.

As already stated hereinbefore, the hardware section of FIGS. 2a and 2b can be used alone or in combination, for various different machines for the production of pasty foodstuffs, it simply being necessary to select the software used, and possibly the connections between the hardware section of the control system and the working parts of the machine.

E.g. a hardware section such as the one in FIGS. 2a and 2b, with appropriate software, can be used for the control of a pasteurizing machine substantially equivalent to the pasteurization unit of the machine for making ice-cream just described with reference to FIGS. 3-7.

The abovementioned pasteurizing machine can have, e.g. a mechanical structure equivalent to that of the pasteurization unit 21 of FIGS. 2a and 2b and a control keyboard 77 and a display unit 78 as illustrated in FIGS. 8 and 9.

As shown in FIG. 8, the keyboard 77 comprises a stop button 81, a high speed agitation button 82, a button for pasteurization at 85° C. 83, a button for pasteurization at 65° C. 84, an intermediate temperature (50° C.) alarm button 85, a button 86 for cooling with low speed agitation, a button 87 for cooling with high speed agitation and a water delivery button 88. The said buttons 81-88 control the switches SW1-SW8 respectively of the hardware section and are provided with the photodiodes D1-D8 respectively of the same hardware section.

As shown in FIG. 9, on the other hand, the display unit 78 comprises a programming button 89 and a forward button 90, controlling the switches SW9 and SW10 respectively of the hardware section, a two-figure and plus sign numerical display 91 controlled by the two display units V1 and V2 of the hardware section and the photodiode D9, a heating display 92 provided with an actuation photodiode D10 and a programming photodiode D11 and a cooling display 93 provided with an actuation photodiode D12 and a programming photodiode D13.

On the basis of the hardware of FIGS. 2a and 2b, by virtue of appropriately selected software at the keyboard of FIG. 8 and at the display unit of FIG. 9, the pasteurizing machine can be operated in the manner described hereinafter.

As far as programming is concerned, once the machine is connected to the electrical network, the buzzer 75 sounds to indicate that the machine is on. Moreover, the photodiode D1 of the stop button comes on, while the numerical display 91 and the remaining displays and photodiodes remain switched off. In this case, when the programming button 89 is pressed, the numerical display 91 is illuminated, indicating the temperature of the tank. When the stop button 81 is pressed again the display 91 goes off.

In order to start programming, after pressing the programming button 89 and thus switching on the numerical display 91, it is necessary to press the forward button 90 several times in order to arrange and show on the display 91 a prearranged number forming an access key or code for programming (e.g. 55). In the event of an error when entering the access code, the display 91 indicates the current temperature of the tank again and denies access to programming.

Subsequently, if the access code has been entered correctly, while the numerical display 91 flashes, it is possible to proceed to programming proper according to the following procedures, which are effected in sequence following successive actuation of the programming button 89:

Programming pasteurization at 85° C.

When the programming button 89 is pressed for a first time, the photodiode D3 begins to flash, the heating programming photodiode D11 comes on and the numerical display 91 indicates the preset temperature (85° C. as a typical value).

The final heating temperature can be adjusted as desired (between 50° C. and 99° C.) by pressing the forward button 90. Otherwise, the latter is left at rest.

When the programming button 89 is pressed again, the photodiode D3 flashes, the cooling programming photodiode D13 comes on and the numerical display 91 indicates the preset temperature (3° C. as a typical value).

The final cooling temperature can be adjusted (between 2° C. and 6° C.) by pressing the forward button 90.

When the programming button 89 is pressed again, the photodiode D3 flashes, the two photodiodes D11 and D13 come on and the numerical display 91 indicates the preset temperature (0 minutes as a typical value).

The waiting time can be adjusted (between 1 and 99 minutes) by means of the button 90.

Programming pasteurization at 65° C.

When the programming button 89 is pressed, the photodiode D4 begins to flash, the heating programming photodiode D11 comes on and the numerical display 91 indicates the preset temperature (65° C. as a typical value).

The final heating temperature can be adjusted as desired (between 50° C. and 99° C.) by pressing the forward button 90.

When the button 89 is pressed again, the photodiode D4 flashes, the cooling programming photodiode D13 comes on and the display 91 indicates the preset temperature (+3° C. as a typical value).

The final cooling temperature can be adjusted by actuating the forward button 90.

When the button 89 is pressed again, the photodiode D4 flashes, the photodiodes D11 and D13 come on and the display 91 indicates the preset time (30 minutes as a typical value).

The waiting time can be adjusted (between 1 and 99 minutes) by means of the button 90.

Programming an intermediate temperature (50° C.) alarm

When the start button 89 is pressed, the photodiode D5 begins to flash and the display 91 indicates the preset temperature (50° C. as a typical value).

The intermediate temperature can be adjusted between 0° C. and 99° C. by means of the forward button 90.

Programming water delivery time

When the programming button 89 is pressed, the photodiode D8 begins to flash and the display 91 indicates the preset time (10 seconds as a typical value).

The delivery time can be adjusted between 1 and 99 seconds by means of the forward button 90.

Programming hot gas intervention temperature

When the programming button 89 is pressed, the photodiodes D3, D4 and D11 begin to flash and the display 91 indicates the preset temperature (−11° C. as a typical value), with the diode D9 switched off to indicate minus temperatures.

The temperature can be adjusted between −5° C. and −25° C. by means of the forward button 90.

Programming hot gas differential temperature

When the programming button 89 is pressed, the photodiodes D3, D4, D10 and D11 begin to flash and the display 91 indicates the preset temperature (3° C. as a typical value).

The temperature can be adjusted between 2° C. and 9° C. by means of the forward button 90.

Programming compressor delay time

When the programming button 89 is pressed, the photodiodes D3, D4, D7, D11 and D13 begin to flash and the display 91 indicates the preset time (typical value 20 seconds).

The compressor delay time can be adjusted between 2 and 50 seconds by means of the forward button 90.

Programming cooling speed

When the programming button 89 is pressed, the photodiodes D7, D6, D11 and D13 begin to flash and the display 91 indicates the preset time (typical value 3 minutes).

The cooling speed time can be adjusted between 2 and 10 minutes by means of the forward button 90.

End of programming

When the programming button 89 is pressed, the display 91 goes off. This indicates that programming is finished.

If the programming cycle is not completed, after approximately 10 seconds the control system returns automatically to the initial state.

Once programming has been effected, the machine is ready to operate according to the following instructions to be selected by the operator:

Agitation

When the agitation button 82 is pressed, the associated photodiode D2 is illuminated and the display 91 indicates the temperature of the tank. This also applies to the subsequent functions. The mixer or agitator is then operating at high speed.

Pasteurization at 85° C.

When the associated pasteurization button 83 is pressed, the associated photodiode D3 comes on together with the heating photodiode D10, heating is effected and the mixer is thus in operation. This situation continues until the programmed temperature is reached. At this point, heating is stopped together with the associated photodiode D10 and the display 91 flashes, indicating the final heating temperature. The buzzer 75 alerts the operator by means of an appropriately selected sound. This is followed by cooling with the refrigeration unit on and with commutation of the hot and cold solenoid valves as required. During this phase, when 45° C. is reached, the agitator moves into low speed operation until the storage temperature (+3° C.) is reached. The tank is subsequently kept thermostated with a variation in temperature of 3° C., with the mixer stopping and starting up again at low speed, accompanied by delayed actuation of the compressor, until the stop button 61 is pressed.

Pasteurization at 65° C.

When the pasteurization button 84 is pressed, the associated photodiode D4 comes on together with the heating photodiode D10 and heating is activated, as is the mixer. The cycle is analogous to the preceding one with a variation in the different final heating temperature values and also in that a programmed rest phase is inserted between heating and cooling, during which the mixer continues to be operated at high speed and the tank is kept thermostated with a variation in temperature of 2° C. for the programmed time (typical value 30 minutes).

Intermediate temperature (50° C.) alarm

This function can be used in association with the cycles for pasteurization at 85° C. and 65° C. When the button 85 is pressed, the associated photodiode D5 comes on. When the programmed intermediate temperature is reached, the buzzer 75 sounds and the display 91 flashes. There is no effect on heating or on the mixer. In order to cancel the function, it is necessary to press the button 85 again.

Cooling with low speed agitation

When the button 86 is pressed, the photodiode D6 is illuminated and the mixer is operated at low speed together with the compressor.

This situation continues until the storage temperature is reached. At this point, the tank is kept thermostated with a variation in temperature of 3° C., with the compressor stopping and starting up again, while the mixer always continues to operate. This continues until actuation of the stop button 81.

This function can be selected together with that of pasteurization at 85° C. or 65° C. in order to obtain continuous low speed agitation for the purposes of cooling.

We claim:

1. A hardware section for a programmable electronic control system adapted for machines, having a pasteurization unit and a whipping unit, for the production of various pasty foodstuffs, said hardware section comprising:
   a microprocessor for sending and receiving control signals;
   a control keyboard card operatively connected to at least one keyboard and to said microprocessor;
   a display card operatively connected to at least one display unit and to said microprocessor;
   non-volatile memory operatively connected to said microprocessor for storing control information;
   at least one thermometer probe, operatively connected to said microprocessor, for sensing a temperature value of said various pasty foodstuffs and additives thereof;
   an outlet relay unit operatively connected to different working parts of said machines; and
   a jumper connection means for enabling said hardware section to accept operational software for varying the operation of said machines to produce said various pasty foodstuffs; wherein,
   input from said keyboard and said thermometer probe is passed to said microprocessor, and said microprocessor sends said control signals to said outlet relay unit for operating said machines and to said display unit.

2. A programmable electronic control system adapted for machines, having a pasteurization unit and a whipping unit, for the production of various pasty foodstuffs, and two identical hardware sections, each comprising;
   a microprocessor for sending and receiving control signals;
   a control keyboard card operatively connected to a keyboard and to said microprocessor;
   a display card operatively connected to a display unit and to said microprocessor;
   non-volatile memory operatively connected to said microprocessor for storing control information;
   at least one thermometer probe, operatively connected to said microprocessor, for sensing a temperature value of said various pasty foodstuffs and additives thereof;
   an outlet relay unit operatively connected to different working parts of said machines;
   said pasteurization unit including a first tank having a vertical axis, a first mixer, a heater means, and a first cooling means;
   said whipping unit including a second tank having a horizontal axis, a second mixer, and a second cooling means; wherein,
   one of said hardware sections is provided for said pasteurization unit and the other of said hardware sections is provided for said whipping unit, input from each of said keyboards and each of said thermometer probes is passed to each respective microprocessor, and each of said microprocessors sends said control signals to respective outlet relay units for operating said machines and to respective display units.

3. A control system according to claim 2 characterized in that said keyboard of said pasteurization unit comprises a stop button, an agitation button, a low temperature pasteurization button, an intermediate temperature alarm button, and at least one timer button.

4. A control system according to claim 2 wherein said keyboard of said pasteurization unit further comprises a high temperature pasteurization button and a chocolate cycle button.

5. A control system according to claim 3 characterized in that said display unit of said pasteurization unit comprises a first programming button, a first forward button, a first numerical display, a plus sign display, a heating display, and a first programming display.

6. A control system according to claim 5 wherein said first programming button and said first forward button of said pasteurization display unit are adapted to enter a first temperature value and a first time value into said control system.

7. A control system according to claim 6 whereby said temperature value and said time value effect a pasteurization cycle by means of said buttons of said pasteurization unit keyboard.

8. A control system according to claim 2 characterized in that said keyboard of said whipping unit comprises a second stop button, an average speed agitation button, a high speed agitation button, a high speed whipping button, an average speed whipping button, and a water delivery button.

9. A control system according to claim 8 further comprises a low speed agitation button, and a granita and cream button.

10. A control system according to claim 8 characterized in that said display unit of said whipping unit comprises a second programming button, a second forward button, a second numerical display, a minus sign display, a cooling display, and a second programming display.

11. A control system according to claim 10 wherein said second programming button and said second forward button of said whipping display unit are adapted to enter a second temperature value and a second time value into said control system.

12. A control system according to claim 11 whereby said second temperature value and said second time value effect a whipping cycle by means of said buttons of said whipping unit keyboard.

* * * * *